Aug. 15, 1933.    J. W. WEST    1,922,563
MACHINE FOR OPERATING ON PLASTIC MATERIALS
Filed Nov. 17, 1931    7 Sheets-Sheet 5
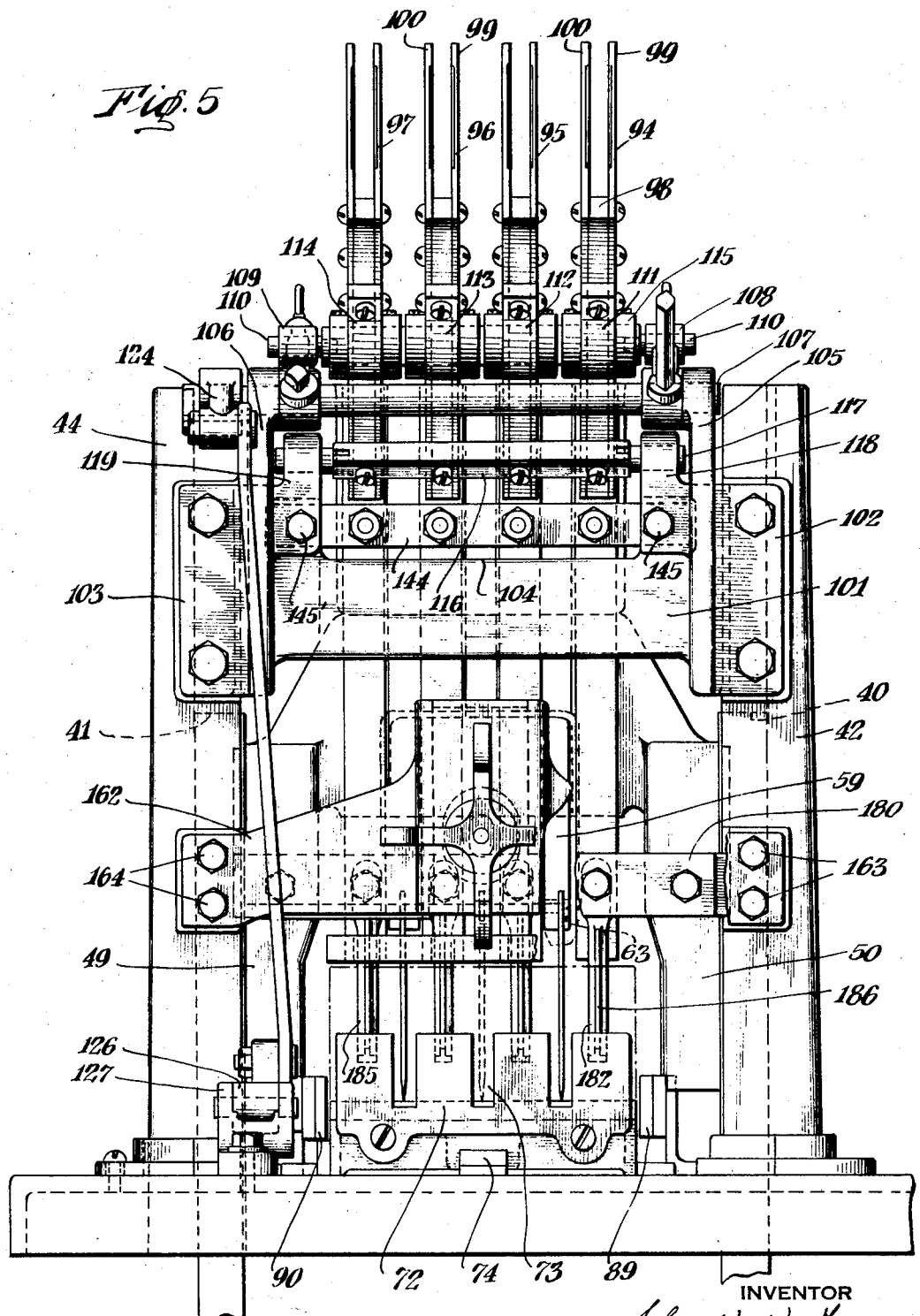

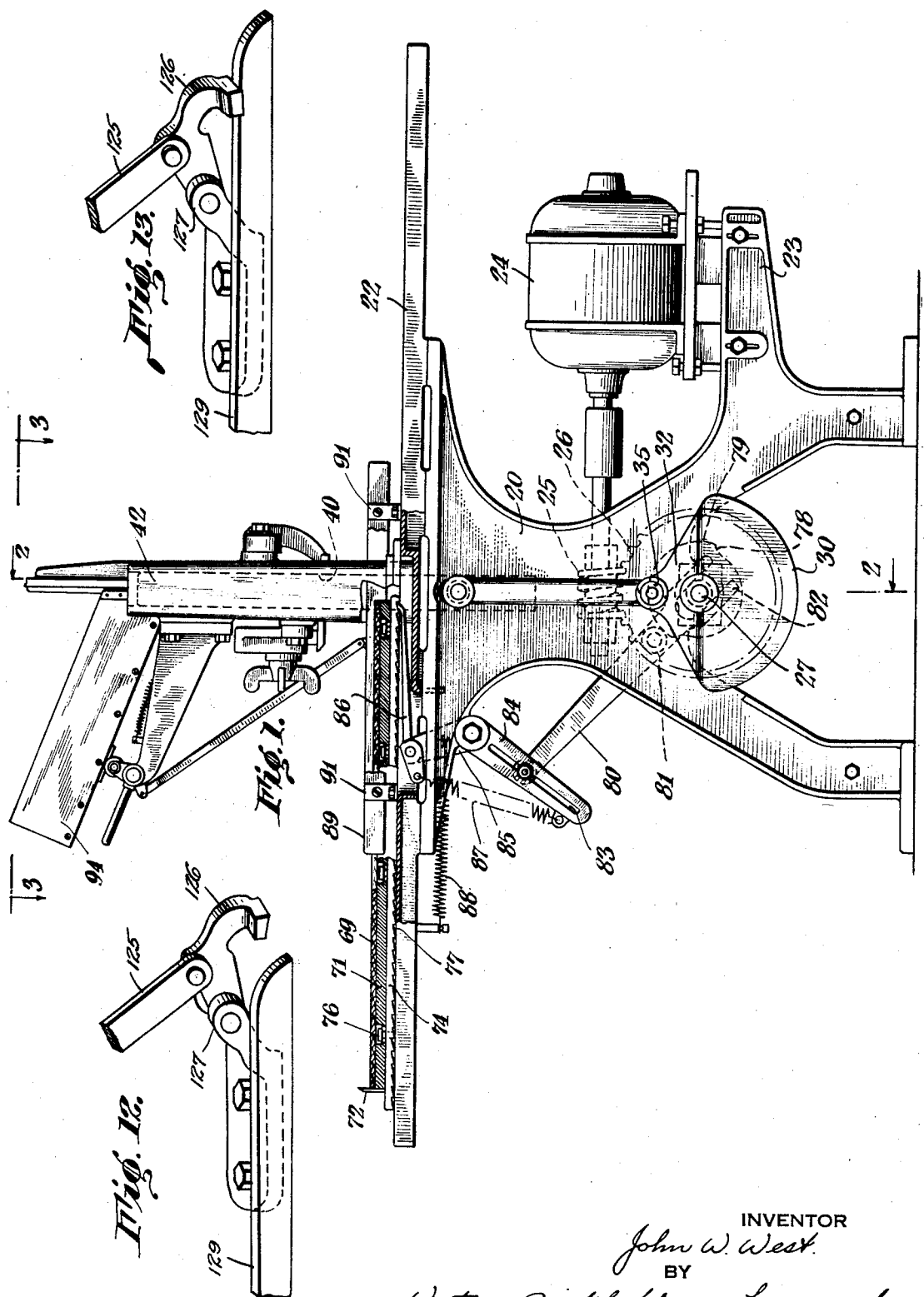

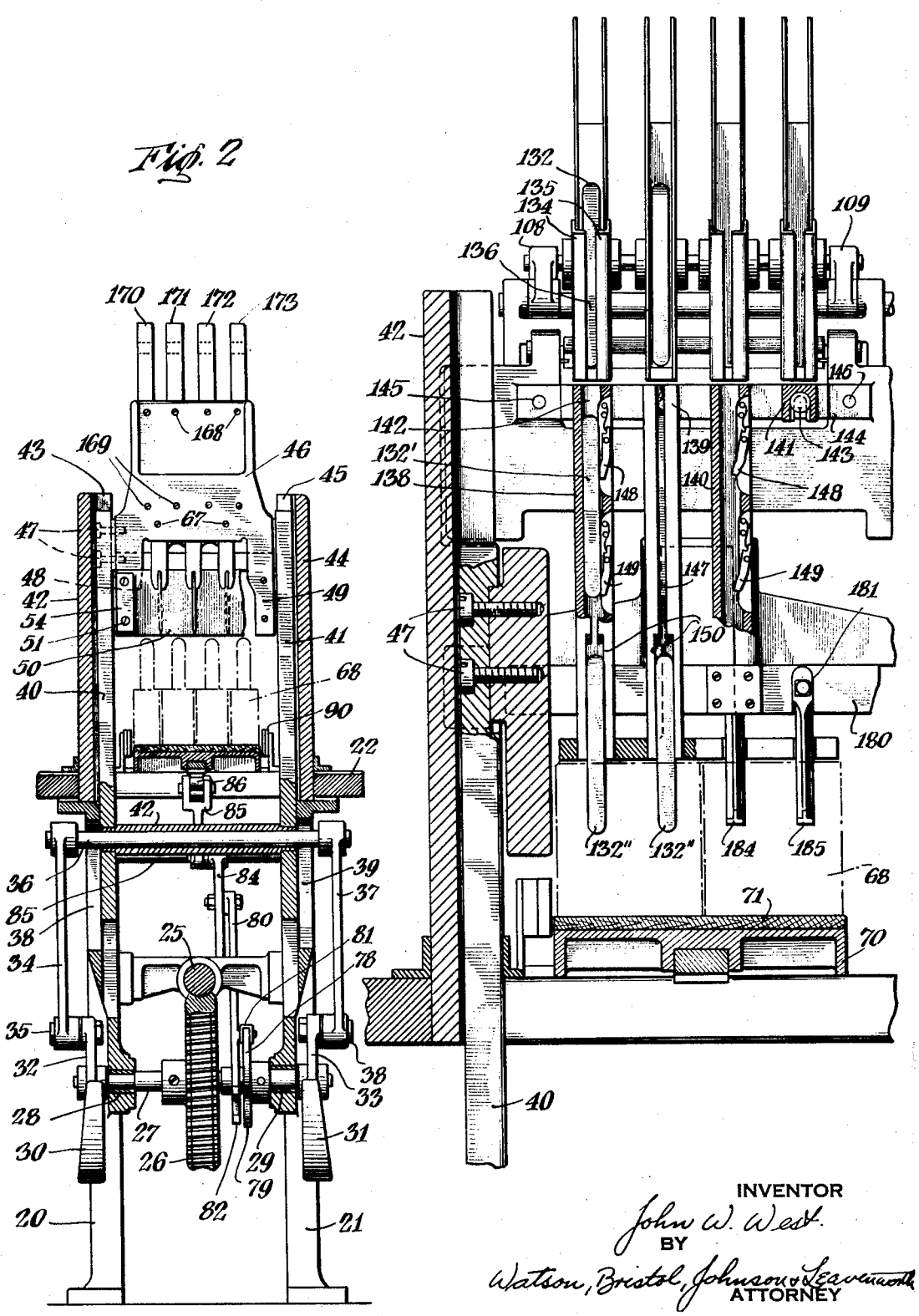

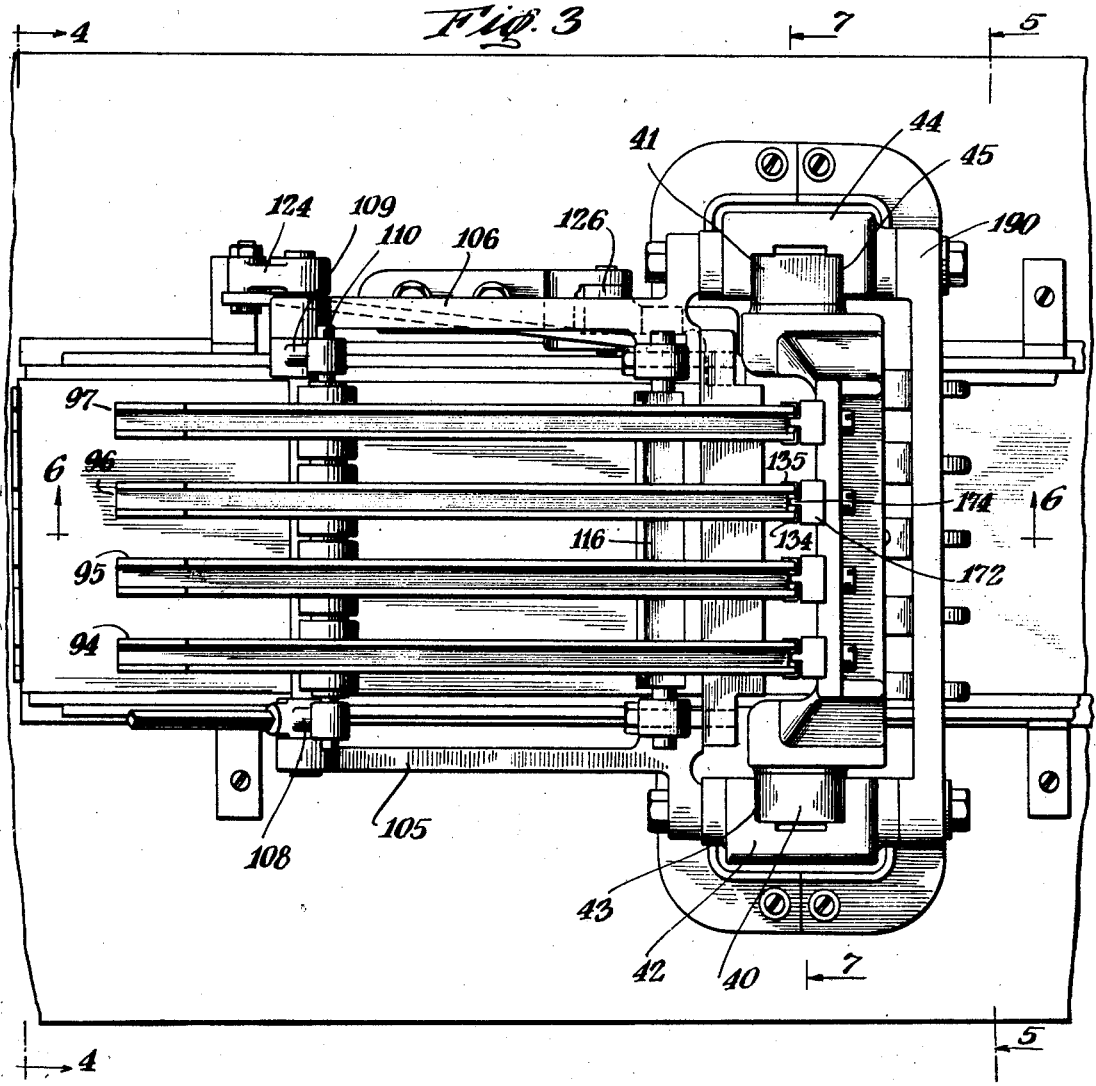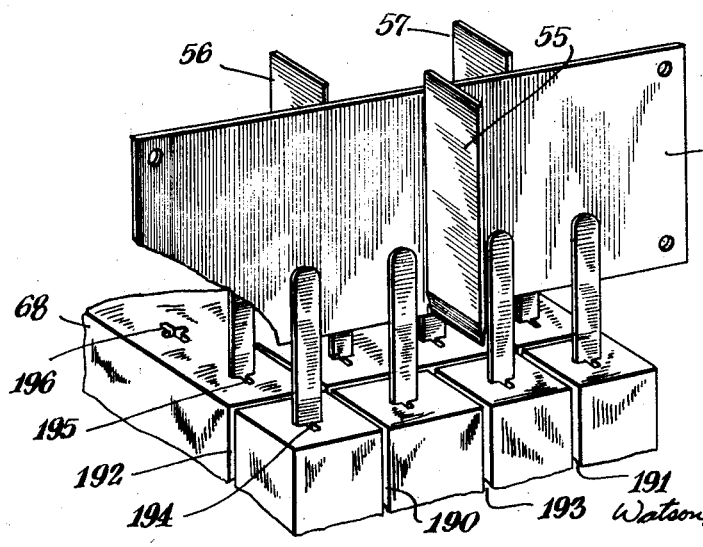

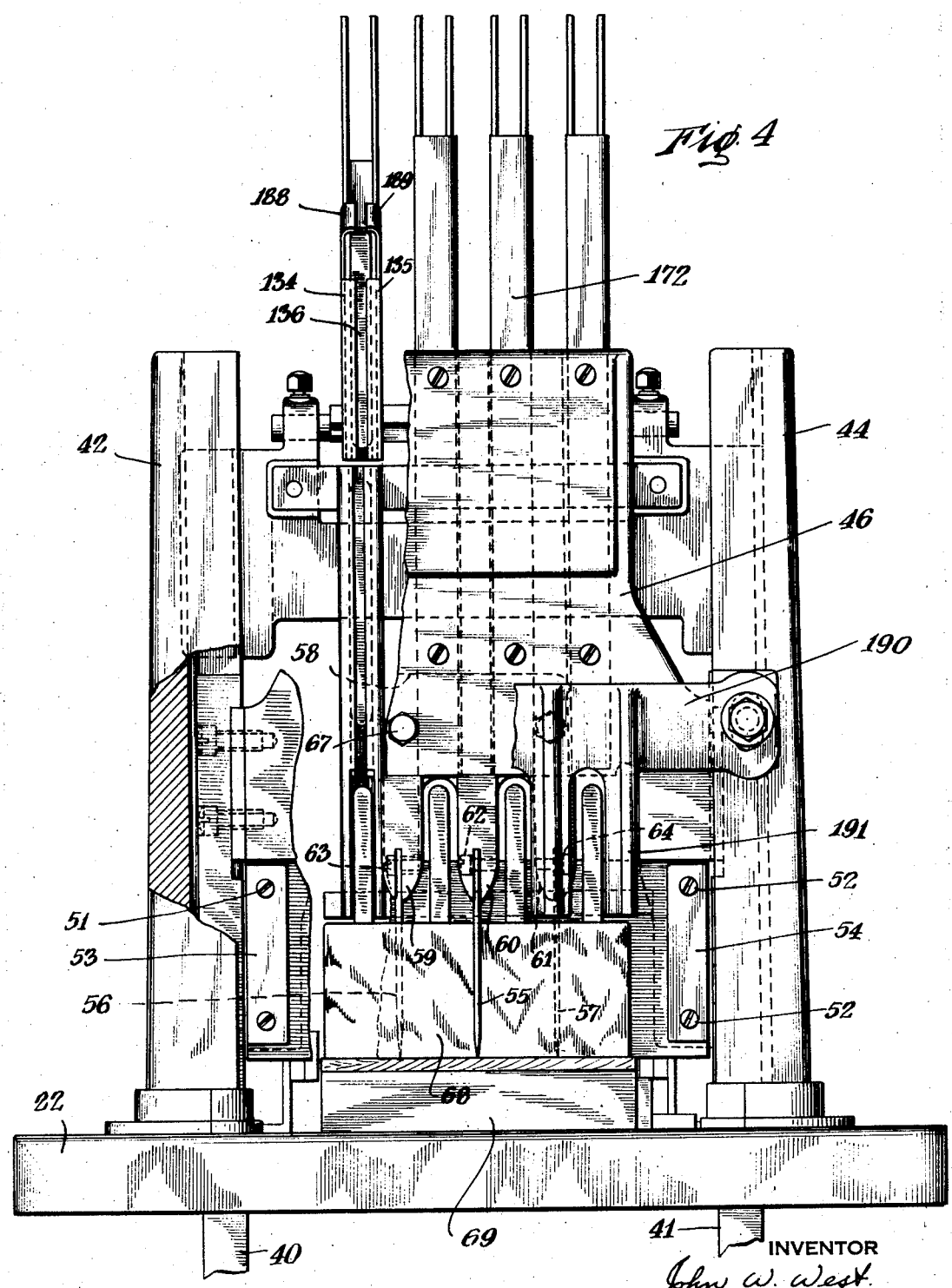

Aug. 15, 1933.  J. W. WEST  1,922,563
MACHINE FOR OPERATING ON PLASTIC MATERIALS
Filed Nov. 17, 1931   7 Sheets-Sheet 6
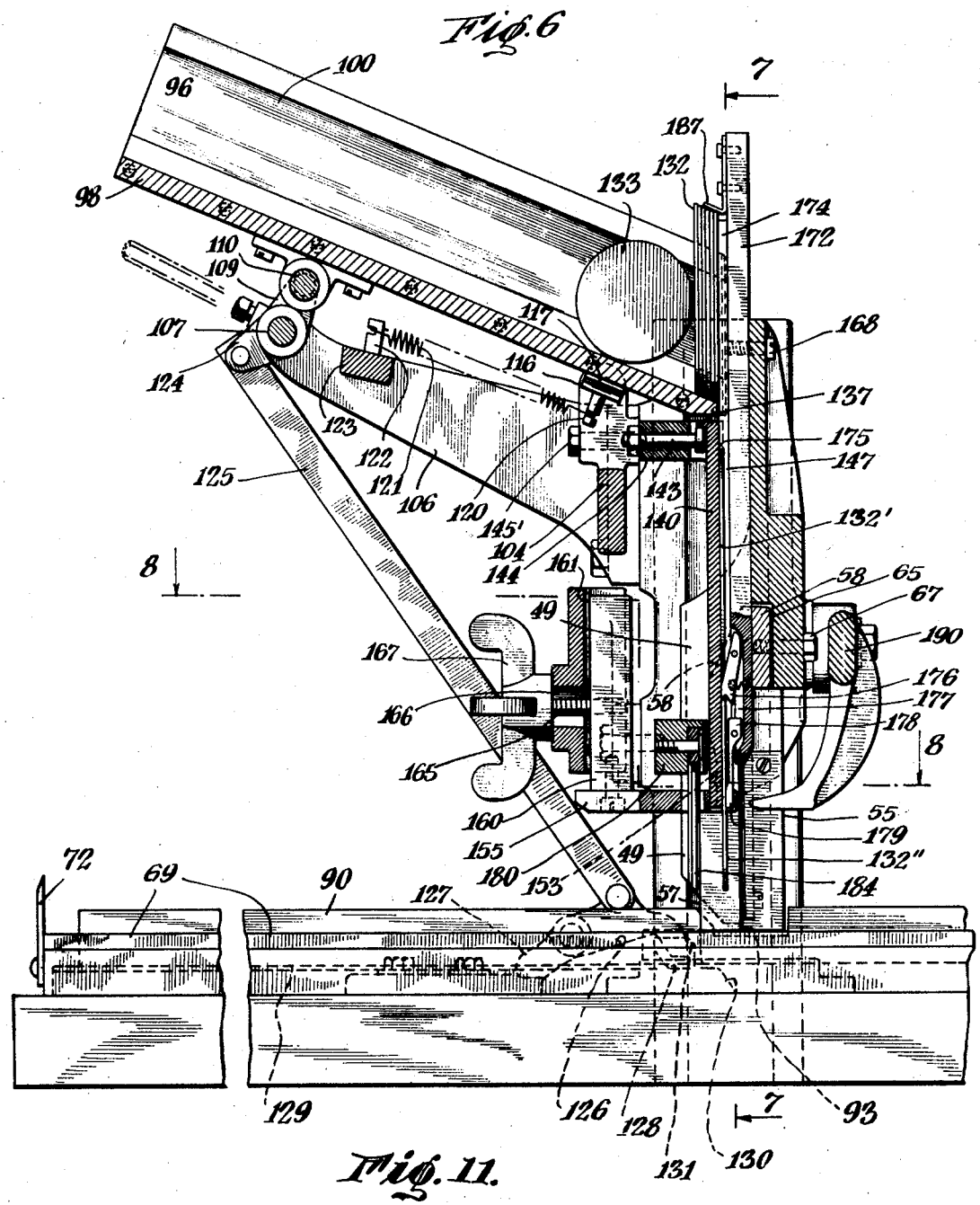
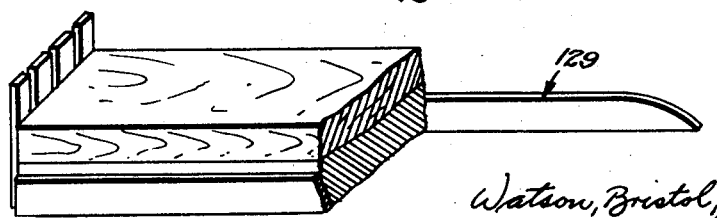
INVENTOR
John W. West.
BY
Watson, Bristol, Johnson & Leavenworth.
ATTORNEY

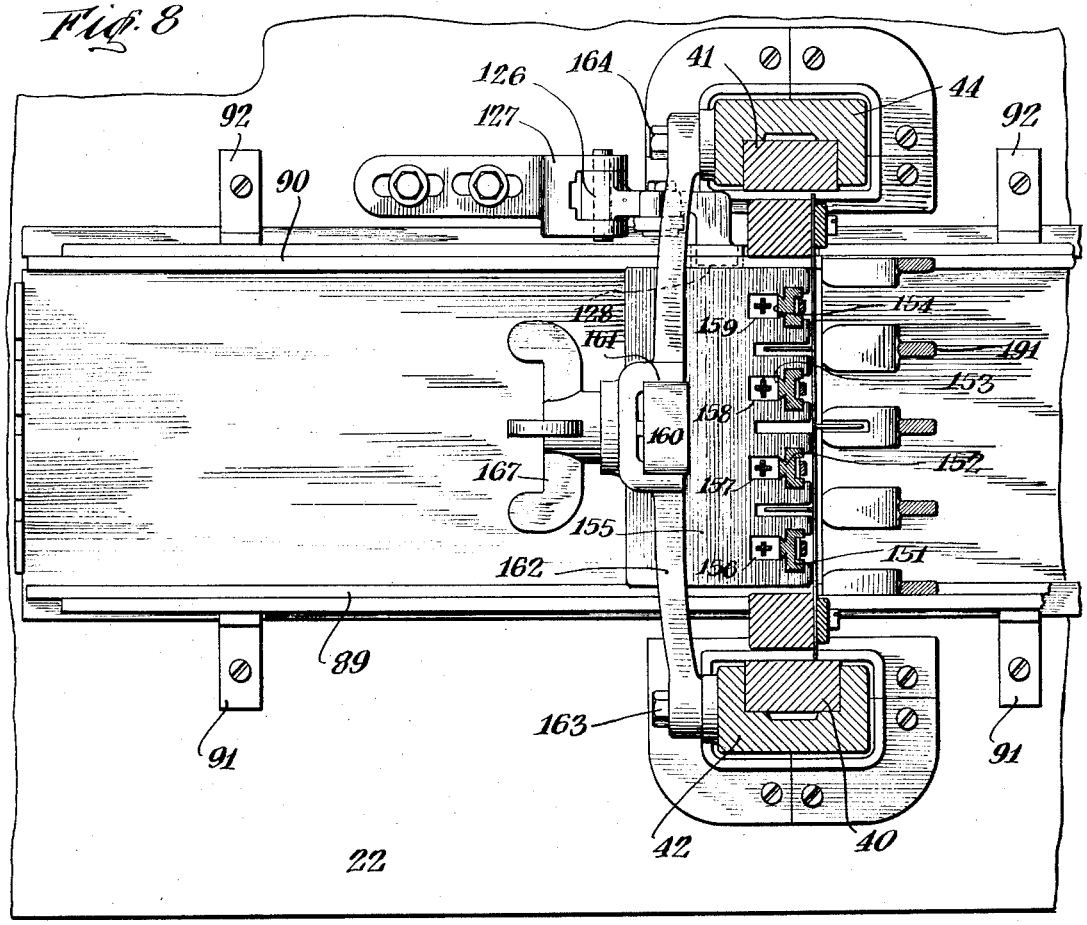

Patented Aug. 15, 1933

1,922,563

UNITED STATES PATENT OFFICE 1,922,563

MACHINE FOR OPERATING ON PLASTIC MATERIALS

John W. West, Maplewood, N. J., assignor to Frozen Confections, Inc., New York, N. Y., a Corporation of Delaware Application November 17, 1931
Serial No. 575,571

19 Claims. (Cl. 107—8)

This invention relates to machines for handling plastic materials, and more particularly to machines adapted to perform certain steps in the manufacture of edible confections having a stick or handle inserted therein, and further relates to a process of making such confections.

A general object of the invention is the provision of a machine of this class having improved efficiency and other generally enhanced characteristics, which is capable of yielding an increased output, while effecting savings in time and labor, as compared with previously available devices.

A further object of the invention is to provide a machine which is adapted to function as a cutter and additionally to perform other desired operations on or in connection with plastic materials.

More specifically, the present invention contemplates provision of a machine which is capable of dividing a mass of plastic material into individual units and inserting a stick or handle in each of such units, and particular objects of the invention are the provision of combinations and sub-combinations of elements useful both effectively to attain this general end and to perform certain subsidiary steps and operations involved therein.

Another object of the invention is the provision of a process whereby a frozen confection having a stick or handle firmly bonded therein by congelation may expeditiously be manufactured.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the application of which will be indicated in the claims.

For a fuller understanding of the nature and objects of the invention reference should be had to the following detailed description taken in connection with the accompanying drawings, in which:

Fig. 1 is a side elevation of the machine, embodying the features of the present invention, certain parts being broken away and others being shown in section more clearly to illustrate the construction;

Fig. 2 is an approximately central transverse sectional view taken substantially along line 2—2 of Fig. 1;

Fig. 3 is a fragmentary top plan view on an enlarged scale, taken substantially over the area indicated by line 3—3 in Fig. 1, but showing the feed board in a more advanced position;

Fig. 4 is a fragmentary rear elevation showing the upper portion of the machine, viewing the same from the right, as shown in Fig. 1, the scale being enlarged to correspond to that used in Fig. 3, and certain parts being broken away more clearly to show the construction;

Fig. 5 is a fragmentary front elevation showing the upper portion of the machine viewed from the left as shown in Fig. 1, the scale being enlarged to correspond to that used in Fig. 3, and certain portions being broken away more clearly to illustrate the construction;

Fig. 6 is a fragmentary longitudinal vertical sectional view, showing the upper part of the machine, taken along line 6—6 of Fig. 3 and showing the near side-plate of one of the hoppers removed, the hoppers being shown in cooperating relationship with their associated structure;

Fig. 7 is a transverse vertical sectional view through the upper part of the machine substantially corresponding to line 7—7 of Fig. 6;

Fig. 8 is a longitudinal, generally horizontal section taken along line 8—8 of Fig. 6;

Fig. 9 is a fragmentary side elevation of certain details of the hopper construction, showing the latter in non-cooperating relationship with its associated parts; and Fig. 10 is a detailed perspective view illustrating the construction and operation of the cutting knife and certain other details of the invention.

Figure 11 is a detail view of the cam bar which is fastened to the side of the feed board.

Figure 12 is a perspective detail view of the cam bar and lever adapted to control the sliding motion of the hoppers. The lever is shown out of contact with the cam member.

Figure 13 is a perspective view similar to Figure 12 but showing the lever in engagement with the cam member.

The embodiment of the invention herein specifically described and illustrated is particularly adapted to the manufacture of a well known type of frozen confection comprising a chocolate coated block of ice cream having a stick or handle frozen therein. Such a confection is described in Patent No. 1,718,997, issued to H. B. Burt on July 2, 1928. The present machine is adapted to perform certain steps whereby the product described and claimed in that patent may be rapidly and efficiently manufactured. However, it will be readily apparent that certain aspects of the present invention are generally applicable to substances having a consistency similar to that of frozen ice cream, such as frozen syrups, frozen sherbets or ices, butter, cheese, and the like. The expression "plastic materials" has been used in the present specification and claims generically to describe all of such substances, whether or not they happen to be moldable or pliable in the strict sense of the term. Accordingly, wherever the context of the present specification and claims permits, the term "plastic materials" is intended to be construed broadly as describing substances such as those mentioned.

In accordance with the best practice previously utilized in the manufacture of stick equipped chocolate coated ice cream, the sticks or handles were inserted in the ice cream while the latter was only partially congealed. After this stick inserting operation, the freezing process was resumed, and after the ice cream was completely congealed, it was subjected to a cutting operation or operations which divided a large block of frozen ice cream containing a number of sticks into a plurality of individual units or blocks, each equipped with a stick. A salient feature of the present machine is the provision of improved means whereby the sticks may be inserted in the ice cream and bonded thereto by congelation after it has been completely frozen, at the same time that the cutting operation is being carried on. Among other advantages, this eliminates the time consuming operation of inserting sticks in the ice cream during an intermediate stage of the freezing process.

Referring more particularly to the drawings, and especially to Figs. 1 and 2 thereof, it will be seen that the present machine comprises a base in the form of two spaced upright supports 20 and 21, to the upper ends of which is fastened a horizontal table 22. Each of supports 20 and 21 is provided with a cantilever support 23, across which rests an electric motor 24. This motor constitutes a source of driving power for the various moving parts of the machine.

Preferably a worm gear 25 is keyed directly to this motor shaft, although, if desired, a suitable clutch mechanism (not shown) may be inserted between the motor and this worm gear. Worm 25 meshes with a worm wheel 26, which is keyed to a drive shaft 27 supported in suitable journals 28 and 29, which are formed in supports 20 and 21, respectively. A pair of crank disks, each respectively comprising counterweight portions 30 and 31 and crank portions 32 and 33, are fixed to the outer ends of drive shaft 27. A pitman or link 34 has its lower end pivoted at 35 to crank portion 32, and has its upper end pivotally mounted on a cylindrical cross rod 36. A similar pitman 37 is pivoted at 38 to crank 33, and has its upper end pivotally mounted on the other end of cross rod 36, which latter extends transversely entirely through the base of the machine, as shown in Fig. 2, and operates in vertical slots 38 and 39, which are formed respectively in supports 20 and 21 to permit vertical reciprocatory movement of bar 36. Cross bar 36 passes through and carries with it a pair of reciprocatory crosshead slide elements 40 and 41, which are kept in spaced relation near their lower ends by a sleeve 42 mounted on bar 36. Element 40 is slidably guided in a fixed upright guide standard 42, provided with a machined channel or way 43 (Figs. 2, 3 and 8), in which element 40 snugly fits. Element 41 similarly is slidably mounted in an upright guide standard 44, having a machined channel 45. Guide standards 42 and 44 rest firmly on supports 20 and 21, passing through suitable openings in table 22, as illustrated. At their upper ends, slide elements 40 and 41 carry a crosshead casting 46, which is secured thereto by means of countersunk screws 47 (Figs. 2 and 7), four such screws being utilized securely to fasten opposite sides of the crosshead 46 between the sliding crosshead members.

Suitable severing means are attached to the crosshead, which is provided with downwardly extending arms 48 and 49 (Figs. 2 and 6) across which a transverse cutting knife 50 is fastened by means of bolts 51 and 52, which respectively pass through and hold in position reinforcing knife clamp bars 53 and 54. The longitudinally extending quartering knives 55, 56 and 57, also are mounted for reciprocation with crosshead 46 and knife 50. Such quartering knives are fastened to head 46 through the agency of a knife brace casting 58 having depending prongs 59, 60 and 61, which are slotted to accommodate the several knives, and which have counter-sunk screws 62, 63 and 64, passing respectively therethrough and through the upper ends of knives 55, 56 and 57. Quartering knife 55 is centrally disposed on the rear side of the transverse blade 50, while knives 56 and 57 are laterally arranged on the opposite or forward side of such blade, as is clearly shown in Figs. 4 and 5. The slotted fingers 59, 60 and 61 extend downwardly over both sides of transverse blade 50, as can be seen from the illustration of the rear and front sides of finger 59 in Figs. 4 and 5. The upper part of casting 58 is in the form of a tongue which is fitted into a recess 65 in the crosshead 46, and is firmly fastened therein by means of screws 67. It will thus be seen that there is provided a severing means comprising transverse and longitudinal blades which are rigidly fastened to and movable with crosshead 46. It will be appreciated that the quartering knives may be positioned on either or both sides of blade 50 in any suitable arrangement, the specified arrangement being exemplary. Also, the spacing between the quartering knives may be altered, for example, by providing interchangeable knife brace castings 58, the prongs 59, 60 and 61 of which may be spaced as desired.

A generally rectangular block of ice cream, designated 68, is adapted to be placed on a feed board 69, which board is intermittently fed toward the severing means in the manner about to be described. This board is generally rectangular in shape, and comprises a cast metallic base 70 made of some light metal such as aluminum, and a wooden upper facing 71 upon which the block of ice cream rests. A back plate 72 is fastened to the rear table end and is slotted as at 73 to accommodate the longitudinal cutting knives 56 and 57 on the final downward cutting stroke. One end of the block of ice cream abuts such plate 72, whereby it is compelled to move along with board 69 as the latter is fed through the severing means toward the rear of the machine. Board 69 has a rack bar 74 centrally disposed along its under side by means of screws 76, which permit removal and replacement of the rack bar when desired. The teeth 77 of this bar are spaced apart a distance corresponding to that through which it is desired to advance the block of ice cream between each cutting operation, and accordingly it may at times be desirable to substitute racks having differently sized teeth. In order intermittently to drive the feed board, a drive cam 78 having an enlarged cam surface at 79, is keyed to drive shaft 27. A cam lever 80 is provided with a roller 81 which rests against the cam surface of the cam 78. The lower end of lever 80 is bifurcated as at 82, and its spaced furcations embrace drive shaft 27 for guiding and steadying purposes. The opposite end of lever 80 is adjustably clamped in a slot 83 located in a depending arm 84 of a bell crank lever, which is rockably mounted on a transverse shaft 85 supported between supports 20 and 21. An upwardly projecting arm 85 of this bell crank lever has pivoted thereto a feed pawl 86, the forward nose of which is constantly urged into the path of the teeth on rack bar 74 by means of a spring 87. An additional spring 88 tends constantly to urge rotation of the bell crank lever in a counter-clockwise direction, and holds roller 81 in close contact with cam 78 at all times. It will be apparent that rotation of drive shaft 27 will, by virtue of the above described structure, effect reciprocation of feed pawl 86. The parts are so designed and related that pawl 86 reciprocates along a path which is somewhat longer than the distance between two successive teeth on the rack bar. Cam 78 is so positioned with respect to cranks 32 and 33 that feeding motion of the board occurs during the latter portion of the up stroke of crosshead 46 and its associated parts.

The feed board 69 is guided in a rectilinear path along the table 22 by means of guide plates 89 and 90, which are held spaced above table 22 on supporting brackets 91 and 92. The upper parts of guides 89 and 90 extend somewhat above the upper surface 71 of the feed board, and additionally serve to confine the block of ice cream against lateral shifting, the ice cream block being substantially the same width as the upper face of the feed board. These guide bars are each provided with a notch 93, which accommodates the transverse cutting blade 50 during the nethermost portion of its cutting stroke.

The present machine is provided with means for inserting sticks into the block of ice cream during the cutting and feeding operation. To this end a series of stick containing hoppers 94, 95, 96 and 97 are arranged near the upper end and in front of the guide standards 42 and 44. Each of these hoppers is in the form of a rather deep trough comprising a bottom 98 and side-plates 99 and 100. A number of sticks are vertically inserted in each of the hoppers, as shown in Fig. 6, where hopper 96 is illustrated with its near side-plate 99 removed to show the interior construction. The hoppers all are mounted for sliding movement on a support casting generally designated 101, (Figs. 5 and 6) which has lateral wings 102 and 103, which are rigidly screwed to abutment seats located near the upper ends of guide standards 42 and 44. Wings 102 and 103 are connected by a transverse strut 104, which serves to rigidify the structure. Casting 101 also is provided with a pair of forwardly extending cantilever supports 105 and 106. Spanning the forward ends of supports 105 and 106 is a rod 107, upon which, near its opposite ends, are mounted a pair of bell crank lever arms 108 and 109, which are spanned by a transverse shaft 110. This rod 110 passes forwardly through a series of hopper support brackets 111, 112, 113 and 114, which are held properly spaced along rod 110 by means of a number of identical collars 115 (Fig. 5). Near its forward end each hopper is mounted at spaced intervals along a sliding support 116, which is slidably carried on a flat transverse rod 117. This rod has cylindrical ends which are mounted for slight rotation in suitable journals 118 and 119 which are cast integrally with support 101. A stud 120 is fixed to the sliding support 116, and a tension spring 121 fastened thereto has its other end fastened to a stud 122 which is fixed to a cross strut 123 extending between the outer ends of cantilever supports 105 and 106. Spring 121 tends constantly to urge the unit of four hoppers toward the left, as viewed in Fig. 6. This spring and cross strut construction has been omitted from Fig. 5 in the interest of clarity, in order better to show the slide construction at 116. Fixed to one end of rock shaft 107 is another bell crank lever arm 124, to which is pivoted a link 125. The lower end of link 125 is pivoted to a lever 126 which is rockably mounted in a support 127 fixed to the table top. The forward portion of lever 126 has an inwardly bent nose 128 (Fig. 8) which extends into the path of a cam bar 129 fastened to the side of the feed board. This cam bar has at its forward end a bevelled cam surface 130, which is adapted during feeding movement of the feed board to raise nose 128, and thus turn bell crank lever arms 124, 108 and 109 in a clockwise direction, sliding the hoppers toward the right, as viewed in Fig. 6, against the tension of spring 121, for a purpose which will more clearly appear in the ensuing description of the operation of the machine. The lower edge of guide 90 is notched at 131 to accommodate the nose 128. A plurality of sticks 132 (Fig. 6) are placed vertically in each hopper and are urged toward the lower ends thereof by suitable means such as a weight 133. One such weight is placed in each hopper, and it may have any desired form enabling it readily to slide down the hopper behind the sticks. At the lower end of each hopper are a pair of angularly shaped end pieces 134 and 135, against which the end stick is arrested in abutting contact, as the series of sticks is forced along the hopper by weight 133. These end pieces are spaced apart so as to leave a slot 136 therebetween, and are spaced somewhat forwardly of the hopper bottom 98 so as to leave an opening 137 (Fig. 6), through which the end stick 132 may be passed downwardly. Four stick chutes 138, 139, 140 and 141, each having a hollow central passage 142 extending therethrough (Figs. 6 and 7), are suspended from the heads of bolts 143, which pass through a chute support bar 144, which is screwed to the hopper support casting 101 by means of screws 145 and 146 (Figs. 4 and 7). Each chute has its passage 142 in registry with the opening 137 at the lower end of its respective hopper, so that a stick 132 may be passed from the hopper into such chute passage. A slot 147 (Figs. 6 and 7) in the rearward face of each chute communicates with its interior passage 142, and is colinear with the slot 136 left between the hopper end plates. In order temporarily to retain a stick within passage 142 after it has traversed partially therethrough, for a purpose which will more clearly appear hereinafter, a pair of spring pressed dogs 148 and 149 are pivotally mounted in each chute at one side of its passage 142. These dogs are adapted to press against one side of a stick located in that portion of passage 139, in order frictionally to hold it between such dogs and the opposite passage wall, in the position indicated at 132' in chute 138 as illustrated in Fig. 7, where such chute has been broken away clearly to show this construction. In Fig. 7, it will also be noted that both chutes 138 and 140 are partially broken away to show the construction of the spring pressed dogs 145 and 146, chute 138 having a stick shown held in place by these dogs, and chute 140 showing the position of the dogs when no stick is located thereagainst. Chute 139 is illustrated in full elevation in this figure, while chute 141 has been broken almost entirely away in order to show the manner of its suspension upon the head of bolt 143. At the bottom of the chutes, slots 144 are widened to the full width of passage 139, as indicated at 150 (Fig. 7). The forward faces of the lower ends of chutes 138, 139, 140 and 141 respectively are provided with dovetail portions 151, 152, 153 and 154, (Figs. 6 and 8), which are vertically inserted and snugly embraced by corresponding dovetail openings in a front stripper plate 155, as is most clearly shown in Fig. 8. These dovetail openings are forwardly extended as at 156, 157, 158 and 159, to provide apertures in the stripper 155, through which a series of daggers, hereinafter to be described, may operate. Front stripper 155 is provided with a vertically extending shank 160, to which it is affixed by means of screws. This stripper shank is adapted adjustably to be held in position in the vertical guide channel 161 of a stripper bracket 162, fastened at 163 and 164 to guide standards 42 and 44 respectively, adjustment being obtained by means of a clamp screw 165, which operates in a slot 166 in the stripper bracket, and which has a manually operable head 167. It will thus be seen that chutes 138, 139, etc. are held in a vertically fixed position between chute support bar 144 and front stripper 153, which latter support elements are held fixed with respect to the rigid standards 42 and 44.

Casting 46 has screwed thereto by means of screws 168 and 169, four vertically reciprocable conveyor bars 170, 171, 172 and 173, which respectively are adapted to cooperate with stick chutes 138, 139, 140 and 141. These conveyor bars, as shown in Fig. 3, seat in vertical grooves in the crosshead. If desired, these grooves may be somewhat wider than the bar, so that the latter may be transversely adjusted therein to permit cutting of differently sized ice cream blocks. Conveyor bar 172, which is most clearly shown in Fig. 6, will be described in detail, the other conveyors being of identical construction. Such conveyor or conveyor bar 172 has at its upper end a rib 174, the lower edge of which forms a stick feeding shoulder 175, which is adapted to operate in slot 147 of stick chute 140, and which also is slidable in slot 136 of hopper 96 when such hopper assumes cooperative relation therewith, that is to say, when it has been slidably moved to the right hand limit of its path of travel, as viewed in Fig. 6. In this figure, the reciprocating crosshead 46 and the associated parts movable therewith are seen at the lowermost point of their vertical stroke. When this crosshead and its associated conveyor bar 172 reach the end of their up stroke, the end stick 132 will move against the conveyor bar so as to underlie shoulder 175 in hopper 96, this stick being urged toward and against the conveyor bar. Upon a succeeding down stroke of conveyor 172, feed shoulder 175 will carry the stick 132 along with it, forcing it downwardly through opening 137 and into and partially through passage 142. At the end of this down stroke the stick will be deposited in the position illustrated at 132' in Fig. 7, where it will be held by dogs 148 and 149 during the next succeeding up stroke of its respective conveyor bar. Near its lower end, conveyor bar 172 is provided with a spring pressed stick feed finger 176, which is mounted for pivotal movement in a medially located slot or groove 177 in the conveyor bar. An additional spring pressed steadying finger 178 also is pivotally mounted in this slot, and has its lower end 179 projecting downwardly beyond the lower end of the conveyor bar. When the conveyor bar reaches the uppermost limit of its travel, stick feeding finger 176 is adapted to spring out over the upper end of the stick located at 132', so that upon the next succeeding down stroke of the conveyor bar, this finger will carry such stick downwardly the rest of the way through the stick chute to the position indicated at 132'' in Figs. 6 and 7. This second stage of the feeding movement of the stick serves to drive the same into the block of ice cream, which in the meantime has been fed beneath the lower end of the stick chute.

Very hard frozen ice cream generally is too hard to allow the sticks to be inserted directly therein by the above described stick inserting structure, and accordingly it will be found advisable to provide preformed stick receiving holes in the block of ice cream, into which the sticks may be inserted with a minimum expenditure of force. To this end, the depending arms 48 and 49 of reciprocating crosshead 46 have fastened across them a dagger support bar 180 provided with a series of spaced notches 181, into which are respectively screwed the upper ends of daggers 182, 183, 184 and 185. Each of these daggers is provided with both forwardly and rearwardly projecting ribs 186, which ribs serve first, to give a substantially cruciform form to the hole punched in the block of ice cream, which permits the outward passage of air therefrom as the flat stick 132 is shoved therein, and secondly, to rigidify the dagger structure. As the dagger bar 180 and its associated daggers are fixed to and movable with reciprocating crosshead 46, it will be seen that the daggers will punch a row of stick receiving holes, across the portion of the ice cream which is located therebeneath, during the last portion of the down stroke of the crosshead structure.

A rear stripper casting 190, most clearly shown in Figs. 3 and 4, is fastened across guide standards 42 and 44 by means of suitable screws. This casting has depending spaced stripper fingers 191, which terminate in flat horizontal portions adapted immediately to overlie the ice cream passing thereunder. Stripper 190 and front stripper 155 are rather snugly juxtaposed over the ice cream block as it is fed along, and prevent the same from being dragged or bounced upwardly out of position.

In operation of the machine, a block of solidly frozen ice cream, preferably having a width four times that of the individual units which ultimately are to be cut, and having a depth equal to that of the longest dimension of the ultimately cut unit, is placed on feed board 69 with its sides substantially flush with the sides of such feed board, and with its rear end abutting the feed board back plate 72. The feed board thus loaded is placed on the front or left hand end (Fig. 1) of table 22, with its advanced end inserted between guides 89 and 90. The board is shoved along between these guides until it registers with a line scratched on the surface of table 22, at which time feed pawl 86 will engage in the first tooth 77 of the rack bar on the feed board, and the end of the block of ice cream will be spaced somewhat forwardly of the cutting or severing means and its other associated structure between standards 42 and 44. The control switch for motor 24 is then closed, whereupon worm 25 drives worm wheel 26, and effects rotation of cranks 32 and 33, which, through the agency of links 34 and 37, and bar 36, drive the reciprocating crosshead sliding elements 40 and 41 vertically upwardly and downwardly within the guide channels 43 and 45 of guide standards 42 and 44. At the same time, substantially during the upward movement of these crosshead sliding members, the raised portion 79 of cam 78 will impel roller 81 and its associated link 80, causing a clockwise rotation of bell crank 84 and 85, thus urging feed pawl 86 toward the right (Fig. 1). When cam surface 79 releases roller 81, spring 88 will pull the bell crank and its associated feed pawl backwardly to the left, in a position wherein the feed pawl can pick up the second tooth on the rack bar. Upon each succeeding feeding stroke of pawl 86, the rack bar is fed forwardly a distance corresponding to the space between two successive teeth on the rack bar, say about three-quarters of an inch, the feed board coming to a drift stop at the end of the driving stroke. As the board thus is fed along, in coordination with successive up and down strokes of the crosshead structure, the block of ice cream eventually will be positioned properly to receive the first row of dagger holes thereacross. That is, assuming each forward feeding stroke to cover three-quarters of an inch, the advanced edge of the block of ice cream will, on the initial dagger stroke, be advanced three-eighths of an inch, or one-half the thickness of the subsequently severed individual unit, beyond the center of the row of daggers. The same feeding stroke of pawl 86, which thus positions the ice cream block to receive its initial row of dagger holes, also advances the feed board to a point at which the face 130 on cam 129 elevates nose 128 of lever 126, actuating link 125, and turning bell crank arm 124 in a clockwise direction, so as to slide the hopper units down into cooperative relation with the conveyor bars in the position illustrated in Fig. 6. The hopper units previously will have been held in the noncooperating position illustrated in Fig. 9. The hoppers will be held in this cooperative position against the tension of spring 121 so long as nose 128 rides along the upper edge of cam 129 on the feed board. With the hoppers thus located, shoulders 175 on the respective conveyor bars will, at the top of their up stroke, overlie the top edge of those sticks 132 which are located over opening 137 at the ends of the respective hoppers. It will be appreciated that these sticks cannot pass downwardly through such opening until impelled by shoulder 175, since they are held in frictional contact against hopper end pieces 134 and 135 by the weight 133. During the ensuing down stroke of the crosshead, the ice cream block will remain stationary, in position to be punched by the daggers as described, and shoulder 175 will drive stick 132 to the position indicated at 132' in Figs. 6 and 7. During the immediately following up stroke of the crosshead, shoulder 175 will leave the stick positioned at 132' and will again be elevated to a position where it can pick up the next end stick from the hopper, the stick at 132' being maintained in that position by the spring pressed dogs 145 and 146. At the bottom of each down stroke of the conveyor bar a conveyor bar tip 187 (Fig. 6) tamps the sticks in the hopper to assure their being in proper position to cooperate with shoulder 175 when it reaches the top of its upward stroke. Also, a pair of inwardly bent hopper tips 188 and 189 (Fig. 4) overlie these sticks to prevent undue upward displacement thereof through frictional contact with rib 174 during the upward stroke of the conveyor bar. The up stroke of the crosshead immediately following that down stroke which positions the first stick at 132', carries stick feeding finger 176 on the conveyor bar to a point just above the upper edge of the stick at 132', where it will be in position to pick up this stick for further downward feeding. During this same up stroke of the crosshead, the feed pawl 86 will advance the feed board a distance of one rack tooth, placing the row of holes previously punched in the ice cream by the daggers directly beneath and in registry with the passages 142 in the respective stick chutes. On the next succeeding down stroke, the ice cream block will remain so positioned, and stick feeding finger 176 will drive the stick then positioned at 132' downwardly into the registered punched holes in the ice cream block to the position indicated at 132'', the stick steadying finger 179 serving properly to position the stick within the passage 139 during this feed stroke. The cruciform shape of the punched holes in the ice cream block will permit ready expulsion of air therefrom as the sticks are so inserted. During this same down stroke of the crosshead, the forwardly projecting quartering knives 56 and 57 will cut quartering notches 190 and 191 (Fig. 10) into the ice cream block, while the transverse cutting blade 50 will descend in a plane substantially flush with the foremost edge of such block. During this same down stroke, the row of daggers again will punch a series of holes across the block of ice cream, this row being located a distance of one feed board rack tooth behind the preceding row of dagger holes. On the next up stroke of the crosshead, the feed board again will be fed so as to position these recently punched dagger holes beneath their respective passages 142 in the stick chutes. The previously inserted sticks also will be pushed clear of their chutes, being free to pass rearwardly therefrom by virtue of the widened slot construction at 150. On the next down stroke, shoulder 175 and feed finger 176 each will pick up a stick and drive it downwardly through the stick chute, the sticks carried by finger 176 being inserted in the second row of dagger holes. On this down stroke, the transverse blade 50 will sever the ice cream block transversely at 192 (Fig. 10), and the rearwardly extending quartering knife 55 will complete the quartering operation by cutting the block at 193. It will be seen that at this stage in the cycle of operations, a row of four individual blocks of ice cream will have been severed from the main block, and a hole will have been punched in each unit and a stick inserted in such hole. In Fig. 10, this condition of the ice cream block is illustrated, the knife blade 50 being shown in position vertically above the transverse cut 192, just as it is leaving such cut. It will be noted that at this time the daggers will have punched three series of dagger holes 194, 195 and 196, and sticks will have been inserted in rows 194 and 195. The row of individual ice cream blocks containing holes 194 will have been completely detached from the main block, as described, and will be in condition for a subsequent chocolate dipping or other desired operations. During subsequent reciprocating strokes of the crosshead 46, the entire block of ice cream will be fed through the punching, severing and stick feeding mechanism, so that the entire block will be cut into individual units, each of which is provided with a stick. It will be noted that the final cut of rearwardly extending quartering blade 55 will take place on a down stroke following that in which sticks 132 are inserted in the final row of individual ice cream blocks. In order to prevent needless feeding of sticks during this final quartering cut, cam bar 129 on the feed board is ended at such a point that it will release nose 128 and permit spring 121 to remove the sticks in the hopper from the path of shoulder 175, this removal occurring on the second from last down stroke of the conveyor bar, so that no stick will be fed toward the ice cream block during the final quartering stroke of blade 55, and no stick will be left positioned at 132' in the stick chute after the feed board has passed completely through the severing and stick feeding mechanism. When the ice cream block thus has been completely severed, the feed board is pushed completely through to the rear of the table 22, until it is free from guides 89 and 90, after which it may be carried away for further desired operations on the severed individual ice cream units. A second board containing a fresh block of ice cream, preferably is thereafter placed in position on table 22, and cutting operations are again begun. Although a number of interchangeable feed boards advantageously may be utilized in this manner, it will be apparent that a single feed board may be repeatedly cleared and used, if desired.

It has been found in actual practice that sticks or handles inserted in a block of solidly frozen ice cream in the above described manner become firmly bonded to the ice cream by congelation. This bond is effected through softening or melting of the ice cream in the immediate vicinity of the stick, followed by re-freezing of such softened or melted ice cream. In operation of the present machine, it appears that the friction developed by driving the daggers into the frozen ice cream block imparts some warmth to the side walls of the hole thus formed, even though the daggers themselves become quite cold during the operation of the machine. This, to some extent, tends to soften or melt the ice cream at the side walls of the stick receiving holes, and this softening or melting is augmented when the stick itself is inserted in such hole. These sticks ordinarily are at normal room temperatures, and are many degrees warmer than the frozen ice cream into which they are inserted. This temperature difference imparts sufficient warmth to ice cream in the immediate vicinity of the stick materially to soften or melt it. Also, there is some further friction developed when the stick is inserted into the hole, the fit between these parts being quite snug. As the stick equipped ice cream unit subsequently is allowed to stand, the frozen main body thereof extracts heat from these softened or melted portions in the vicinity of the stick, and the latter again become solidly congealed. This re-frozen ice cream becomes firmly bonded to the stick and to the main body of the frozen confection through congelation, the crystals formed during such re-freezing passing into, and even, at times, entirely through the stick, whereby the confection and stick are firmly bonded and interlocked. Since the stick equipped units usually are stored in a cold chamber having its temperature below the freezing point of the confection, the re-freezing of the softened or melted ice cream in the immediate vicinity of the stick is doubly assured. It will thus be seen that while with the present machine the stick is inserted in the ice cream block after the latter has once been frozen, the ultimate bond between the stick and the ice cream, nevertheless, is a firm one formed by congelation, as contemplated in the above mentioned Patent No. 1,718,997 to H. B. Burt. It will be clear that the herein described melting and re-freezing action also will be obtained when other frozen confections than ice cream, such as frozen syrups, custards, sherbets, and the like, are operated upon by the present machine, and that a firm frozen bond between the stick and confection will be formed when the plastic material operated upon falls within this class of frozen confections.

It will be seen that there has been provided a machine that is admirably suited to fulfill its intended functions, and particularly that there has been provided a stick feeding and inserting mechanism constituting a marked improvement over the best previous means for inserting sticks in a substance of the nature herein contemplated.

Since certain changes in carrying out the above process and in the constructions set forth, which embody the invention may be made without departing from its scope, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A machine for operating on frozen material, comprising, in combination, severing means for dividing said material, feed mechanism for advancing said material toward said severing means, means for piercing stick receiving holes in said material, and means adapted automatically to insert sticks in such holes.

2. In a machine for operating on frozen material, the combination comprising a reciprocating crosshead having mounted for movement therewith piercing means, stick conveying means, and severing means.

3. In a machine for operating on frozen material, the combination comprising means for piercing stick receiving holes in such frozen material, means for inserting sticks in such holes, and feed mechanism for advancing such pierced material from said piercing means into registry with said stick inserting means.

4. In a machine for operating on frozen material, the combination comprising means for piercing stick receiving holes in such frozen material, means for inserting sticks in such holes, feed mechanism for advancing such pierced material from said piercing means into registry with said stick inserting means, and means controlled by said feed mechanism for preventing stick insertion until the pierced material is so registered.

5. In a machine for operating on frozen material, the combination comprising means for piercing stick receiving holes in such frozen material, a movable stick containing hopper, means for conveying sticks from said hopper partially into said frozen material, feed mechanism for advancing pierced plastic material from said piercing means into registry with said stick conveying means, and means controlled by said feed mechanism for moving said hopper into cooperating relationship with said stick conveying means.

6. In a machine for operating on frozen material, the combination comprising a feed board for carrying a mass of such plastic material, a movable stick containing hopper, conveying means for carrying sticks from said hopper to said material, and means operable upon movement of said feed board to a predetermined position to move said hopper into cooperative relationship with said conveying means.

7. In a machine for operating on frozen material, the combination comprising a supply source for sticks, and reciprocatory stick conveying mechanism, said mechanism having means for carrying a stick part way to such material during one reciprocatory stroke and having additional means for carrying said stick into such material during a subsequent stroke.

8. In a machine for operating on frozen material, the combination comprising severing means for dividing such material, means actuated with said severing means for piercing stick receiving holes in the frozen material and means for inserting sticks into said holes.

9. In a machine for operating on frozen material, the combination comprising a supply source for sticks, a stick chute in registry therewith and with said frozen material, stick restraining means in said chute for temporarily holding a stick therewithin, and conveyor means operative to carry a stick from said supply source to said restraining means and thence to said frozen material.

10. A machine for operating on frozen materials, comprising in combination, a reciprocating crosshead carrying means for piercing stick receiving holes in said material, stick conveying means on said crosshead, severing means on said crosshead, and intermittently advancing feed mechanism adapted to carry said material beneath said crosshead for operation thereon by said piercing, stick conveying, and severing means.

11. A machine for operating on frozen materials comprising a drive means, a reciprocating crosshead driven thereby, means on said crosshead for piercing stick receiving holes in said frozen material, a supply source for sticks, means on said crosshead for conveying sticks from said supply source into the holes pierced in said frozen material, severing means on said crosshead for dividing said frozen material, a feed board for carrying said material, and feed mechanism driven by said drive means adapted to feed said board with its associated frozen material into cooperative positions with respect to said piercing, stick conveying, and severing, means.

12. In an apparatus for operating on frozen materials, a punch or dagger for piercing a stick receiving hole in such frozen material, said punch being so configured that the hole formed thereby comprises a stick accommodating portion and a portion permitting egress of air as a stick is inserted therein, and means for inserting a stick in said hole.

13. In an apparatus for operating on frozen materials, a hole forming punch or dagger having a cross-section approximately corresponding to the cross-section of a stick or handle which is to be inserted in the hole formed thereby, said punch being provided with rib means projecting from at least one face thereof, means for driving said punch into such frozen material to form a hole, and means for thereafter inserting a stick in said hole, the rib on said punch forming a passage which permits expulsion of air from the hole while the stick is being inserted.

14. In an apparatus for operating on frozen materials, the combination comprising a punch or dagger having a cruciform cross-section, means for driving said punch into a mass of frozen material to form a cruciform stick receiving hole therein and means for thereafter inserting a flat stick in said hole.

15. The process of applying handles to a frozen body, which comprises providing the body with apertures and air escape passages adapted to receive handle members, and inserting the said handle members into said apertures while allowing free escape of entrapped air through said escape passages not occupied by said handle members.

16. The process of applying handles to a frozen body, which comprises providing the body with apertures adapted to receive handle members, providing the apertures with vents cut into the frozen body, and inserting the handles into the said apertures while allowing free escape of entrapped air through the vents.

17. The method of applying handles to a frozen body, which comprises providing the body with recesses and air vents, and inserting the handles into the recesses, thereby forcing entrapped air from said recesses out through said vents.

18. In a machine for operating on a block of frozen material, the combination of means for severing a portion of said material from the block and means for simultaneously forming holes for the reception of sticks in the unsevered portion of the block.

19. The process of applying sticks to frozen material to serve as handle members therefor, which comprises forming in the body of the frozen material stick receiving apertures of generally cruciform shape and inserting sticks into said apertures so that entrapped air may escape through portions of the cruciform opening not occupied by the stick during insertion.

JOHN W. WEST.